(12) United States Patent
Axelrod et al.

(10) Patent No.: US 8,789,496 B2
(45) Date of Patent: Jul. 29, 2014

(54) ARTICULATING CHEW TOY

(75) Inventors: Glen S. Axelrod, Colts Neck, NJ (US); Ajay Gajria, Maharashtra (IN)

(73) Assignee: T.F.H. Publications, Inc., Neptune City, NJ (US)

( * ) Notice: Subject to any disclaimer, the term of this patent is extended or adjusted under 35 U.S.C. 154(b) by 120 days.

(21) Appl. No.: 12/793,372

(22) Filed: Jun. 3, 2010

(65) Prior Publication Data

US 2011/0297104 A1 Dec. 8, 2011

(51) Int. Cl.
*A01K 29/00* (2006.01)

(52) U.S. Cl.
USPC .......................................... 119/710; 119/709

(58) Field of Classification Search
USPC .......... 119/709, 702, 707, 710; 446/370, 371, 446/375
See application file for complete search history.

(56) References Cited

U.S. PATENT DOCUMENTS

| | | | |
|---|---|---|---|
| 1,359,030 A | 11/1920 | Cabana | |
| 3,555,723 A * | 1/1971 | Kopsch et al. | 446/382 |
| 6,042,155 A | 3/2000 | Lockwood | |
| 6,074,270 A * | 6/2000 | Wilcox et al. | 446/370 |
| 6,478,653 B1 * | 11/2002 | Langton | 446/373 |
| 6,685,533 B1 * | 2/2004 | Lee | 446/373 |
| 7,066,411 B2 * | 6/2006 | Male et al. | 239/587.1 |
| 2006/0102099 A1 * | 5/2006 | Edwards | 119/710 |

OTHER PUBLICATIONS www.vidyya.com/archives/0430_1.htm "Barbie legs make better fingers" Apr. 30, 2000 vol. 1, Issue 17.*
E-A-R Aearo Technologies, "SuperSheet™ Foams", Materials Summary Sheet, Delaware, 2007.

* cited by examiner

*Primary Examiner* — Monica Williams
(74) *Attorney, Agent, or Firm* — Grossman, Tucker, Perreault & Pfleger, PLLC

(57) ABSTRACT

A toy for an animal is provided which comprises a covering of a first polymeric composition; a core of a second polymeric composition which is harder than the first polymeric composition. The core comprises a first member having a first member longitudinal axis connected with a second member having a second member longitudinal axis, wherein the first member is pivotable relative to the second member longitudinal axis and the second member pivotable relative to the first member longitudinal axis.

16 Claims, 6 Drawing Sheets

ARTICULATING CHEW TOY

FIELD OF THE INVENTION

The present invention relates to toys for animals, particularly pets, and particularly pet chew toys. More particularly, the present invention relates to a pet chew toy that articulates and makes noise when articulating.

BACKGROUND

Pets, and particularly dogs, are known for their penchant to bite, gnaw and otherwise chew upon objects, particularly items which may spur their natural instincts, such as natural bones. Unfortunately, dogs may also chew objects such furniture, shoes, hats and other household items causing unwanted damage thereto.

In light of the above, numerous toys have been developed to provide dogs with an enjoyable object to chew. Preferably, such toys are a distraction to which the dog, or any other pet, will direct its attention and chew upon instead of coveted items such as household décor.

While most dogs may enjoy chewing on objects, preferences appear to vary as to the hardness of the substances favored. Some dogs may like to chew on very hard materials such as cow bones, wood and nylon, while other dogs may prefer softer materials such as rubber or other elastomers. Such dogs, due to their age, may not be able to chew on very hard substances. Young dogs may have insufficiently developed teeth, while old dogs may have diseased gums or may have lost some of their teeth.

Attempts have been made at creating toys that attract pets, such as providing toys in the shape of animal bones, generally having a larger end and smaller shaft to allow the dog to more easily pick them up. Also, in this manner, a dog may hold the bone between their paws in order to chew it, thus providing a means for easy access to maintain interest.

Another means to make a toy more attractive to a pet may be to include an enclosed bell or an air squeaker. However, if removed from the toy, it pay be possible for these items to be swallowed by the pet.

Another purpose of animal toys has been to provide a surface upon which the animal's teeth may be scraped. Pets, such as dogs and cats, are subject to dental health problems. These problems may be traced to the formation of bacterial plaque that forms on the exterior of teeth. Tartar is the result of the thickening and hardening (mineralization) of the plaque. Dental prophylaxis is promoted in pets, and especially dogs, by the scraping of surfaces against the pet's teeth.

Another purpose of animal toys has been to provide exercise for the animals by encouraging play. Certain pets, do to a sedentary lifestyle, may gain weight or suffer from other health problems. Consequently, play is encouraged in pets to reduce the likelihood of such health issues.

While the above certainly contribute to the art of providing chew toys, there is still a need for improvement. It is an object of the present invention to improve upon the art of chew toys by providing a relatively flexible chew toy that provides noise in conjunction with articulation, and which may promote dental prophylaxis and which may encourage play.

SUMMARY

According to one object of the present invention, a toy for an animal is provided which encourages the animal to play to provide exercise for the animal, as well as encourages the animal to chew upon to promote dental prophylaxis and other health benefits.

According to another object of the present invention, a toy for an animal is provided which comprises a covering comprising a first polymeric composition and a core comprising a second polymeric composition which is harder than the first polymeric composition. The core comprises a first member having a first member longitudinal axis connected with a second member having a second member longitudinal axis, wherein the first member is pivotable relative to the second member longitudinal axis and the second member pivotable relative to the first member longitudinal axis.

According to another object of the present invention, the first member may be rotatable up to 360 degrees around the second member longitudinal axis, and the second member may also be rotatable up to 360 degrees around the first member longitudinal axis.

According to another object of the present invention, the first member may comprise a male engagement element which is connected with a female engagement element of the second member. The male engagement element is sized to snap-fit into the female engagement element. The male engagement element may comprise a ball shaped element and the female engagement element comprises a socket shaped element. The first member and the second member may form a spheroidal joint, and may be identical.

According to another object of the present invention, the core may be transitionable from a first shape to a second shape, and maintain the second shape after a transition from the first shape to the second shape. The core may provide sound audible to a human during the transition from the first shape to the second shape, and thus the core may provide a sound device.

According to another object of the present invention, the core may be in a cavity formed by the covering. The covering may form a barbell shape having end portions connected by an elongated portion. The end portions may be larger than the elongated portion.

According to another object of the present invention, the elongated portion may include at least one raised ridge or recess around a circumference of the elongated portion. The elongated portion may be cylindrical.

According to another object of the present invention, the first polymeric composition may comprise an elastomer or rubber. The second polymeric composition may comprise a rigid thermoplastic polymer such as polyacetal and polyester.

According to another object of the present invention, the toy may be provided in the shape of a bone, an animal, such as a fish, or any other shape suitable for play and biting, gnawing or otherwise chewing.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
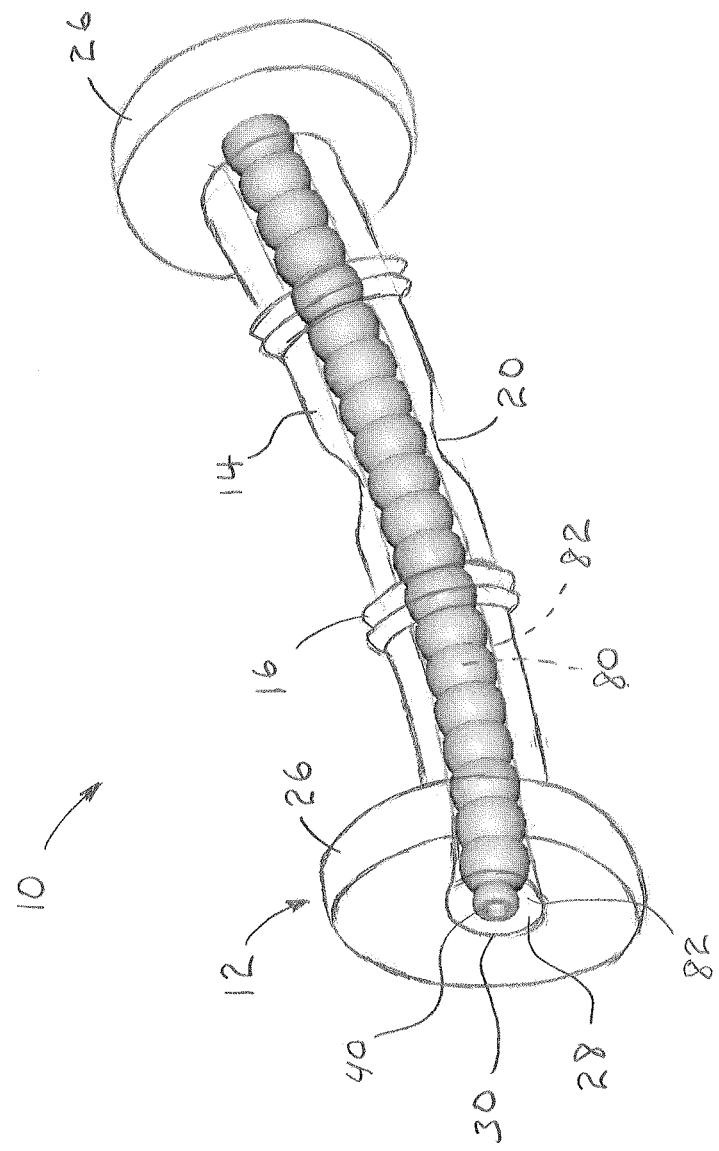
FIG. 1 is a perspective view of a chew toy according to one embodiment of the present invention.

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting.

Referring to FIG. 1, a chew toy for an animal, such as a dog or other pet, is shown at reference character 10. Chew toy 10 may comprise a pliable outer member 12 having a polymeric composition which may comprise one or more natural or synthetic polymers, such as a thermoplastic polymer or a thermoset polymer. More particularly, the polymeric composition may comprise a thermoplastic elastomer or a thermoset elastomer. As used herein, an elastomer may be characterized as a material that has an elongation at 23° C. of at least 50% with a recovery in a range of 50% to 100% when released from stress.

Exemplary elastomers may include styrene block polymers, such as styrene block copolymers (e.g. styrene-butadiene copolymer) and styrene block terpolymers (e.g. styrene-butadiene-styrene terpolymer, styrene-ethylene/butylene-styrene terpolymer, styrene-ethylene/propylene-styrene terpolymer); polyolefin blends (e.g. polypropylene and ethylene-propylene-diene monomer rubber, polypropylene and nitrile rubber); elastomeric alloys such as melt-processable rubbers and thermoplastic vulcanizates; polyolefins; polyurethanes; polyesters; thermoplastic polyamides; and rubbers such as natural rubber, neoprene, nitrile, styrene butadiene and butadiene rubber.

Outer member 12 and the polymeric composition thereof may also be characterized by one or more of the following properties as measured by ASTM D638 Type V dumbbells tested at 20 in/min: a tensile strength in a range of or any increment between 1,000 psi. to 5,000 psi., and more particularly 2,000 psi. to 4,000 psi., and even more particularly 2,500 psi. to 3,500 psi.; and/or an ultimate elongation in a range of or any increment between 100% to 1000%, and more particularly 300% to 800%, and even more particularly 500% to 700%.

The outer member 12 and the polymeric composition thereof may also be characterized by a Shore A durometer indentation hardness as measured by ASTM D2240-05 in a range of or any increment between 10 to 90, and more particularly 20 to 80, and even more particularly 30 to 70. The outer member 12 and the polymeric composition thereof may also be characterized by a tear strength as measured by ASTM D624-00(07), die C, at 20 in./min. in a range of or any increment between 100 ppi. to 600 ppi., and more particularly 200 ppi. to 500 ppi., and even more particularly 300 ppi. to 400 ppi. The outer member 12 and the polymeric composition thereof may also be characterized by a puncture strength as measured by ASTM D120-02a at 20 in./min. in a range of or any increment between 25 ppi. to 200 ppi., and more particularly 50 ppi. to 150 ppi., and even more particularly 75 ppi. to 125 ppi. The outer member 12 and the polymeric composition thereof may also be characterized has having an elongation at room temperature of at least 100% with a recovery in a range of 80% to 100% when released from stress.

As shown in FIG. 1, outer member 12 may comprise an elongated body 14. As shown, elongated body 14 may be cylindrical. Also as shown, elongated body 14 may comprise at least one ridge 16 around a circumference of elongated body 14, as well as a at least one recess 20 around the circumference of elongated body 14, both of which may be used to promote holding of chew toy 10 by the animal. Ridge 16 may be used to promote dental prophylaxis while recess 20 may be used to accommodate the animal's tongue. For example, ridge 16 may rub against the animal's teeth and gums to clean the teeth by removing food residue, plaque and other coatings which may be on the teeth.

Continuing with FIG. 1, outer member 12 may further comprise at least one enlarged flanking end portion 26 which flank elongated body 12, which may simulate condyle portions of a bone. As shown, with the incorporation of enlarged flanking portions 26, which are shown as having a disc shape, outer member 12 may take on the shape of a barbell.

Outer member 12 may further comprise an elongated internal cavity 28. As shown, cavity 28 extends longitudinally through elongated body 12, as well as flanking portions 26, where it may be viewed from opposing end apertures 30.

Figure 2:
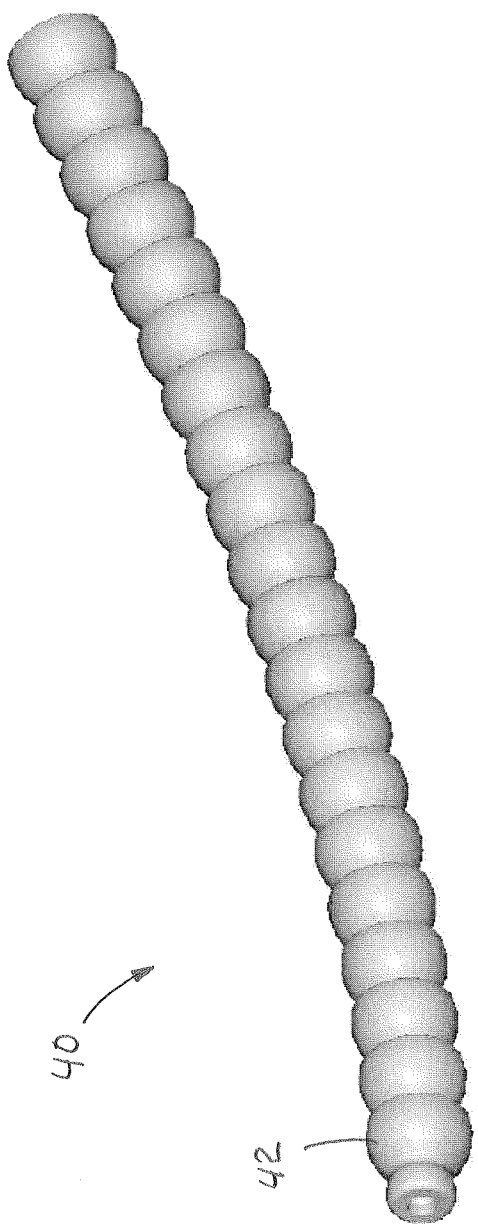
FIG. 2 is a perspective view of an inner member of the chew toy of FIG. 1.

Within cavity 28, chew toy 10 may include an inner or core member 40, with outer member 12 providing a sheathing or covering for inner member 40. As shown in FIG. 2, inner member 40 may comprise a plurality of repeating connectors 42, each of which provide a link forming a modular conduit.

Repeating connectors 42 have polymeric composition which may comprise one or more natural or synthetic polymers, such as a thermoplastic polymer. Exemplary thermoplastic polymers may include polyacetal and polyester.

More particularly, the inner member 40 and the polymeric composition thereof may comprise a rigid polymer and/or a polymer which may be harder than the polymeric composition used for outer member 12. As used herein, a rigid polymer may be characterized as a material which has a modulus of elasticity whether in flexure or in tension greater than 700 MPa (100 kpsi) at 23° C. and 50% relative humidity as measured by ASTM methods D747, D790, D638, D882 or D883. As used herein, inner member 40, such as connector 42, may be characterized as being made of a composition which is harder than a composition used for outer member 12 if inner member 40 has a greater (higher value) Shore durometer indentation hardness value as measured by ASTM D2240. Inner member 40, such as connector 42, may be characterized by a Shore D durometer indentation hardness as measured by ASTM D2240 in a range of or any increment between 65 to 140, and more particularly 70 to 120, and even more particularly 75 to 100.

Figure 3:
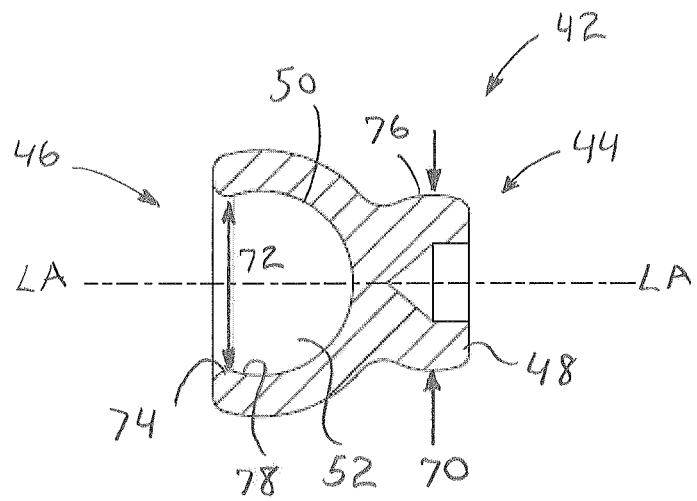
FIG. 3 is a cross-sectional view of a connector of the inner member of FIG. 2.

As shown in FIG. 3, connector 42 may include a body with opposite first and second end portions identified at reference characters 44 and 46, respectively. First end portion 44 may include a male engagement element 48, such as a rounded head or ball shaped element, which may be cylindrical or spherical. Second end portion 46 may include a female engagement element 50 defining a cavity 52 to receive male engagement element 48 as explained in greater detail below. Elements 48 and 50 may have a passage formed therethrough (not shown) which extends along a longitudinal axis LA of the connector 42. As shown, the longitudinal axis of each connector 42 is horizontal, but may be at any other axis (e.g. vertical) during use of chew toy 10 and manipulation of inner member 40.

Figure 4:
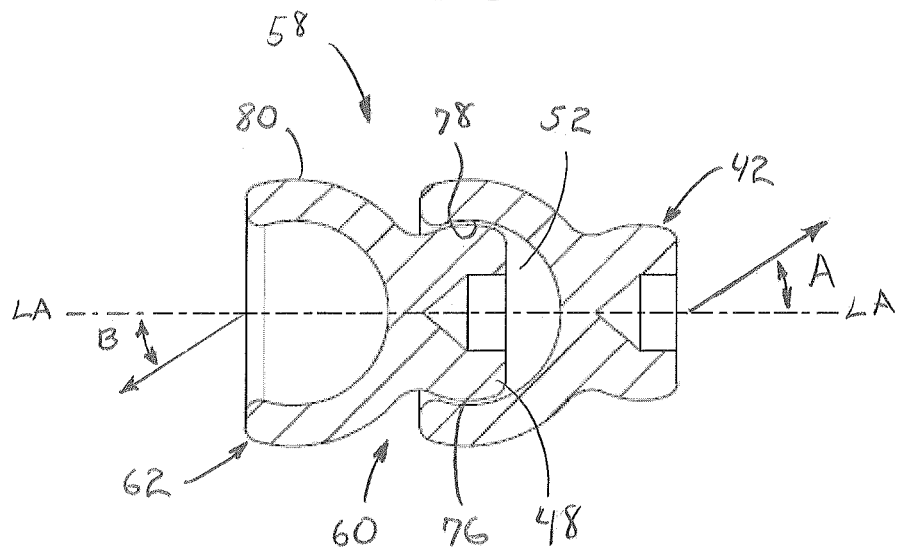
FIG. 4 is a cross-sectional view of two assembled connectors of the inner member of FIG. 2.

As shown in FIG. 4, the female engagement element 52 may be adapted to receive the male engagement element 48 of another connector such as other connector 62 (which in the present embodiment is the same as connector 42) and form a spheroidal or ball and socket joint 60 therewith. Thus, the connectors 42 and 62, as well as additional similar connectors, may be interconnected to provide a modular conduit assembly 58 with numerous spheroidal joints 60 for inner member 40.

As best shown in FIG. 3, the maximum circumference 70 of male engagement element 48 (as shown by the arrows) is greater than the maximum circumference 72 of the entrance opening 74 to female engagement element 50 (as also shown by the arrows). During assembly, male engagement element 48 is quickly forced into female engagement element 50 with a snap or interference fit, causing female engagement element 50 and entrance opening 74 to elastically deform and increase to a size to accommodate the insertion of male engagement element 48 into female engagement element 50. In this manner, as soon as circumference 70 of male engagement element 48 is located within female engagement element 50, entrance opening 74 decreases in size to inhibit male engagement element 48 from separating from female engagement element 50, thus connecting separate repeating connectors 42 together. A plurality of connectors 42 may be configured to be assembled in this manner to form an articulatable conduit 58 of a desired length for inner member 40.

Inner member 40 may articulate into numerous shapes due to the formation of a spheroidal joint 60 between each of the connectors. At each spheroidal joint 60 formed by adjacent connectors, the first connector 42 may pivot at an angle A in a range of and any increment between 0.1 degrees to 90 degrees, and more particularly 0.1 degrees to 45 degrees, and even more particularly 0.1 degrees to 30 degrees relative to a longitudinal axis LA of a second connector 62 and may rotate 360 degrees around the longitudinal axis LA of a second connector 62. Similarly, the second connector 62 may pivot at an angle B in a range of 0.1 degree to 90 degrees, and more particularly in a range of 0.1 degrees to 45 degrees, and even more particularly 0.1 degrees to 30 degrees relative to a longitudinal axis LA of a first connector 42 and may rotate 360 degrees around the longitudinal axis LA of a first connector 42. Alternatively, adjacent connectors 42 and 62 may be arranged such the longitudinal axis LA of each connector 42 and 62 is parallel, and may form a unitary, straight (linear) axis along the length of the connectors 42, 62.

While the spheroidal joint 60 formed by adjacent connectors may provide a wide range of motion between the connectors, the joint 60 may be configured to articulate at a predetermined force at least great enough such that the joint 60 does not articulate under its own weight, and may only be articulated when the predetermined force is exceeded. Consequently, when such an articulation force is provided, joint 60 and inner member 40 may then be articulated from a first shape to a second shape, with the second shape maintained by the inner member 40 upon removal of the articulation force. In this manner, inner member 40 may only articulate when the requisite articulation force is applied, for example, by the jaw of an animal to chew toy 10 and inner member 40. This feature of chew toy 10 is to enhance the animal's interest in chew toy 10 by providing articulation of chew toy 10 in direct response to an application of biting force to the toy 12.

Figure 5:
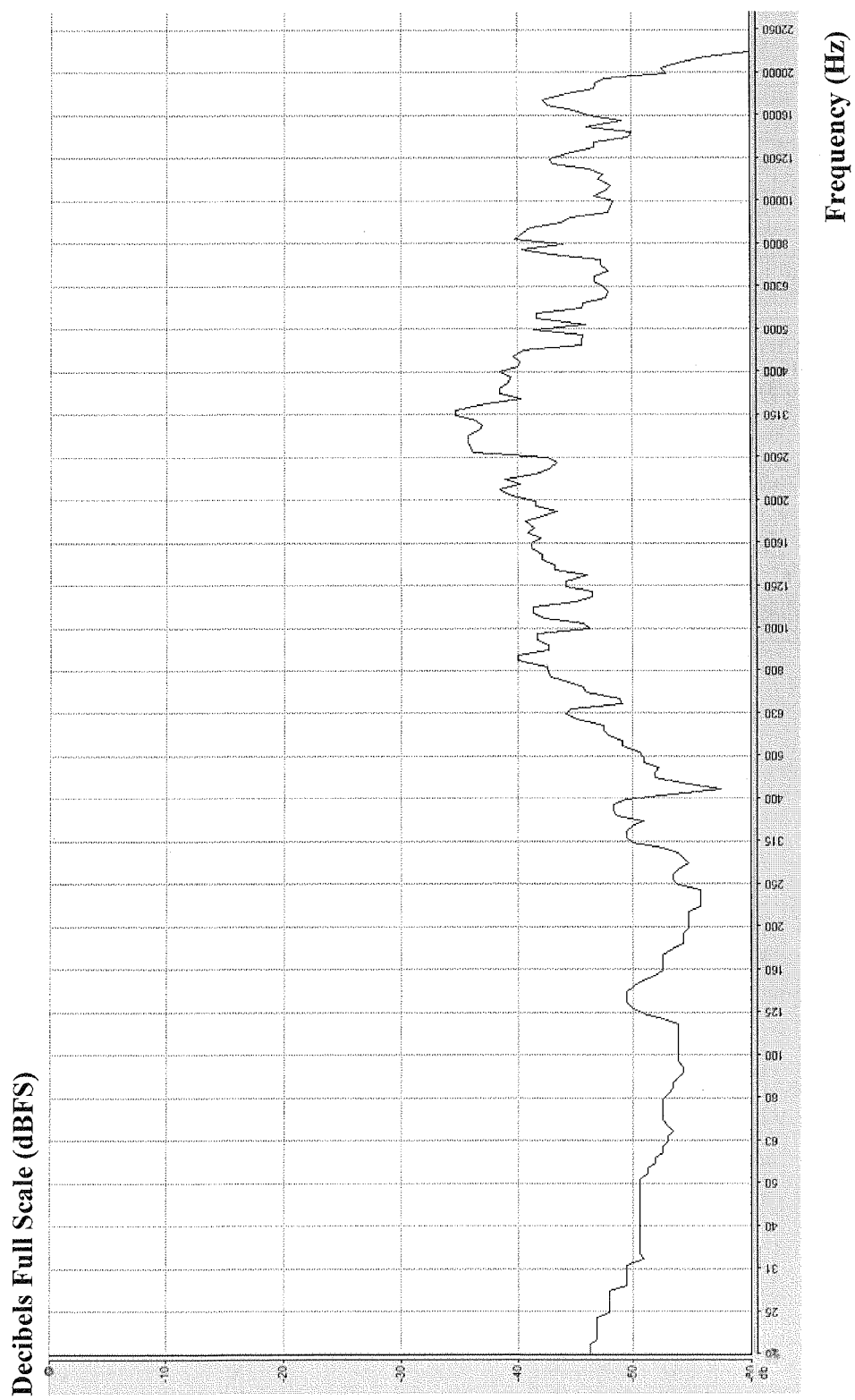
FIG. 5 is a graph of decibels versus frequency for sound provided from the chew toy of FIG. 1.

Additionally, spheroidal joint 60 may be configured to provide sound at a frequency and loudness suitable to be heard by humans (exemplary frequency range may be about 20-20,000 Hz), as well as animals (exemplary frequency range about 50-45,000 Hz for dogs). For example, spheroidal joint may be designed such that a surface 76 of male engagement element 48 may rub, slide or otherwise frictionally move against an opposing surface 78 of female engagement element 50 when spheroidal joint 60 is articulated and produce short, high pitched sounds, such as a series of squeaks, clicks or ratchets during the articulation, which may simulate a creaking sound. FIG. 5 shows an exemplary graph of the decibels and frequencies of the sounds which may be provided from chew toy 10 when articulated. As shown, sound may be provided in a frequency range of or any increment between 20 Hz to 21,000 Hz. Exemplary inclusive ranges may include 20 Hz to 20,000 Hz, and 630 Hz to 17,000 Hz which may include the greatest sound (volume) level. As shown in FIG. 5, the greatest sound level may occur in a range of 2500 to 3150 Hz.

In certain embodiments, the loudness of sounds produced during the articulation of spheroidal joint(s) 60, may be decreased (e.g. muffled or dampened) by the outer member 12. In other embodiments, sounds produced during the articulation of spheroidal joint(s) 60 may be transmitted through elongated body 14 or apertures (such as apertures 30) in the outer member 12. In still other embodiments, sounds produced during the articulation of spheroidal joint(s) 60 may be enhanced by similar sounds produced by surface 80 of connector 42 rubbing, sliding or otherwise frictionally moving against a surface 82 defining internal cavity 28, which also may be transmitted through elongated body 14 or apertures (such as apertures 30) in the outer member 12. In still other embodiments, sounds may be produced by surface 80 of connector 42 rubbing, sliding or otherwise frictionally moving against a surface 82 defining internal cavity 28 without any articulation of spheroidal joint(s) 60, such as by stretching (placing in tension), twisting or rotating outer member 12 around or otherwise relative to inner member 40.

After the requisite number of connectors 42 have been connected to form inner member 40, inner member 40 is then inserted into cavity 28 through one of the apertures 30 in outer member 12 to form chew toy 10.

During assembly, inner member 40 may be forced into cavity 28 with an interference fit, causing outer member 12 and, in particular cavity 28 and aperture 30, to elastically deform and increase to a size to accommodate the insertion of inner member 40 into outer member 12. In this manner, inner member 40 is inhibited from separating from outer member 12.

Figure 6:
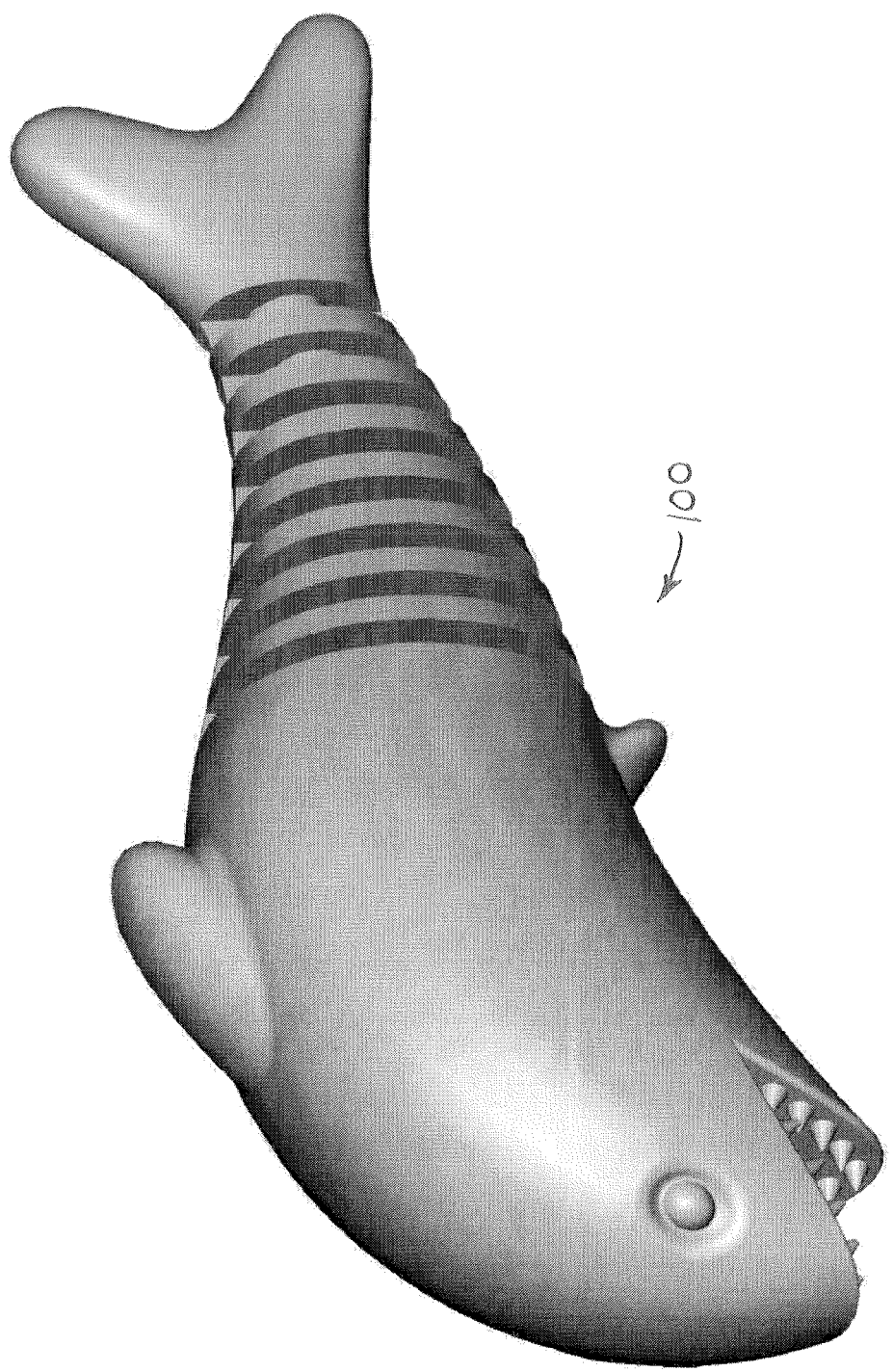
FIG. 6 is a perspective view of another chew toy according to another embodiment of the present invention.
Figure 7:
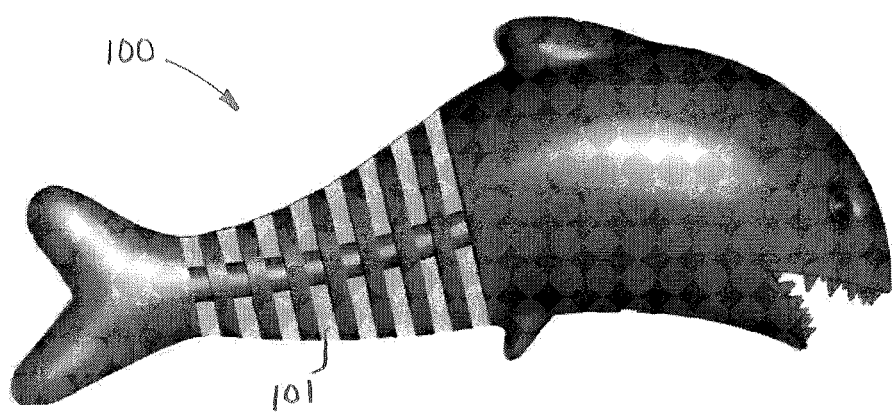
FIG. 7 is a side view of the chew toy of FIG. 5.
Figure 8:
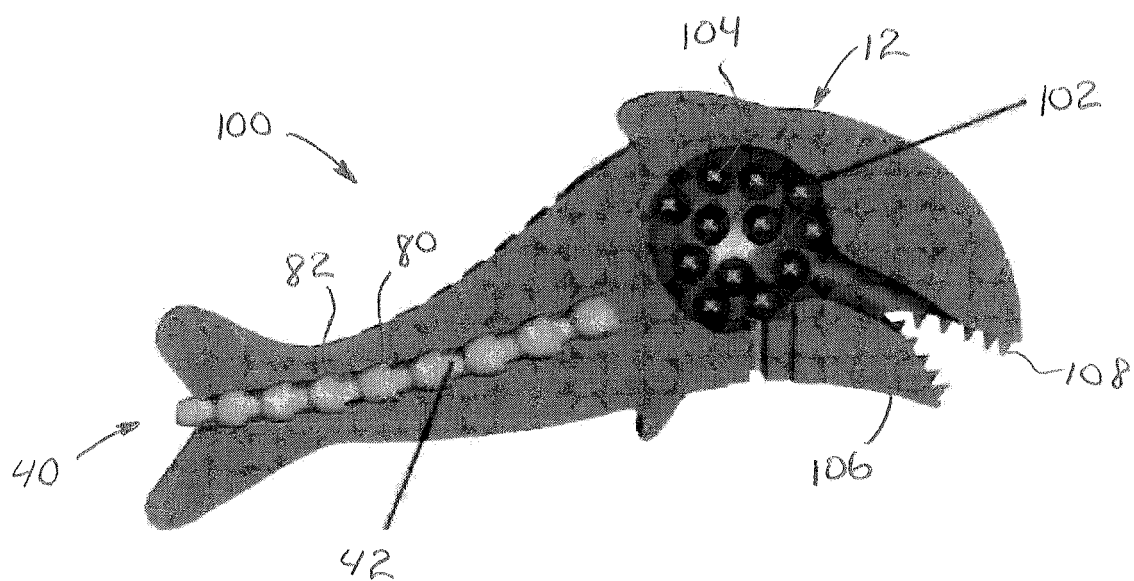
FIG. 8 is a cross-sectional view of the chew toy of FIG. 5.

Referring to FIGS. 6-8, a second embodiment of the chew toy 10 is shown in the form of a fish 100. In FIG. 8, inner member 40 may provide the backbone (spine or vertebral column) for fish 100, and each connector 42 may simulate a vertebra thereof. With this construction, when an animal, such as a dog, is playing with chew toy 10 and bites the backbone, the inner member 40 may articulate to provide the animal with the sense of breaking or crushing the backbone. As shown, the fish 100 may further include a series of recesses 101 in the backbone area to simulate the appearance of a fish skeleton (the neural spine (dorsal projections) and hemal arch) and also provide for easier articulation of inner member 40.

As shown, fish 100 also includes a cavity 102 which holds food treats 104 which may be expelled from aperture 106 when fish 100 is manipulated during use thereof, such as squeezing outer member 12. Here, the teeth 108 are used to inhibit, but not prevent, expulsion of the food treats 104.

While a preferred embodiment of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed is:

1. An animal toy comprising:
an articulating chew toy which provides sound in conjunction with articulation in direct response to an application of a biting force to the toy from an animal, wherein the articulating chew toy comprises a covering overlying a core;
the covering comprising a first polymeric composition, and forming a cavity which contains food treats;
the core comprising a conduit of connectors, the connectors comprising a second polymeric composition which is harder than the first polymeric composition;
the connectors comprising a first member having a first member longitudinal axis connected with a second member having a second member longitudinal axis;
wherein the first member is pivotable relative to the second member longitudinal axis;
wherein the second member is pivotable relative to the first member longitudinal axis; and
wherein the first polymeric composition is an elastomer, and has a tear strength as measured by ASTM D624-00 (07), die C, at 20 in./min, in a range of 100 ppi. to 600 ppi. and a tensile strength as measured by ASTM D638 Type V dumbbells at 20 in./min, in a range of 1,000 psi. to 5,000 psi.;
wherein the toy is articulable from a first shape to a second shape; and
wherein the toy, when being articulated from the first shape to the second shape, provides sound over a frequency range of 20 Hz to 20,000 Hz when the cover and core are articulated together from the first shape to the second shape.

2. The toy of claim 1 wherein:
the first member is rotatable around the second member longitudinal axis; and
the second member is rotatable around the second member longitudinal axis.

3. The toy of claim 2 wherein:
the first member is rotatable 360 degrees around the second member longitudinal axis; and
the second member is rotatable 360 degrees around the first member longitudinal axis.

4. The toy of claim 1 wherein:
the first member comprises a male engagement element which is connected with a female engagement element of the second member.

5. The toy of claim 4 wherein:
the male engagement element is sized to snap-fit into the female engagement element.

6. The toy of claim 4 wherein:
the male engagement element comprises a ball shaped element and the female engagement element comprises a socket shaped element.

7. The toy of claim 1 wherein:
the first member and the second member form a spheroidal joint.

8. The toy of claim 1 wherein:
the core maintains the second shape after a transition from the first shape to the second shape.

9. The toy of claim 1 wherein:
the first member and second member are identical.

10. The toy of claim 1 wherein:
the core is in a cavity formed by the covering.

11. The toy of claim 1 wherein:
the first polymeric composition comprises rubber.

12. The toy of claim 1 wherein:
the second polymeric composition comprises a rigid thermoplastic polymer.

13. The toy of claim 1 wherein:
the second polymeric composition is selected from the group consisting of polyacetal and polyester.

14. The toy of claim 1 wherein:
the covering includes one or more apertures to transmit sound produced within the toy.

15. The toy of claim 1 wherein:
the core and covering are frictionally movable relative to one another.

16. A method of manipulating an animal toy comprising:
providing an animal toy comprising:
an articulating chew toy which provides sound in conjunction with articulation in direct response to an application of a biting force to the toy from an animal, wherein the articulating chew toy comprises a covering overlying a core;
the covering comprising a first polymeric composition, and forming a cavity which contains food treats;
the core comprising a conduit of connectors, the connectors comprising a second polymeric composition which is harder than the first polymeric composition;
the connectors comprising a first member having a first member longitudinal axis connected with a second member having a second member longitudinal axis;
wherein the first member is pivotable relative to the second member longitudinal axis; and
wherein the second member is pivotable relative to the first member longitudinal axis;
articulating the animal toy from a first shape to a second shape;
providing sound from the animal toy while articulating the animal toy; and
wherein the first polymeric composition is an elastomer, and has a tear strength as measured by ASTM D624-00 (07), die C, at 20 in./min. in a range of 100 ppi. to 600 ppi. and a tensile strength as measured by ASTM D638 Type V dumbbells at 20 in./min. in a range of 1,000 psi. to 5,000 psi.;
wherein the toy, when being articulated from the first shape to the second shape, provides the sound over a frequency range of 20 Hz to 20,000 Hz when the cover and core are articulated together from the first shape to the second shape.

* * * * *